Figure 2:
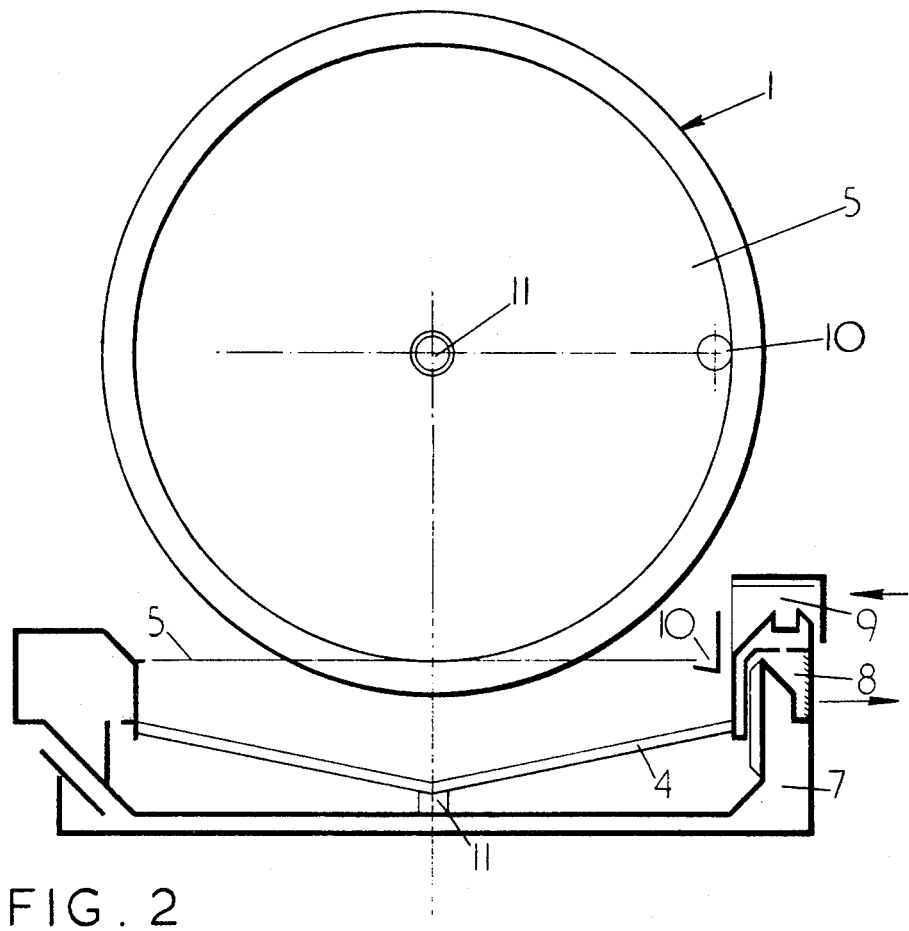

United States Patent [19]

Charnoe

[11] 4,055,915
[45] Nov. 1, 1977

[54] METHOD OF AND APPARATUS FOR TREATING PLANT ORGANISMS

[75] Inventor: Zeera Polyandre Charnoe, Alvah, (near Banff), Scotland

[73] Assignee: Devatron Limited, Insch, Scotland

[21] Appl. No.: 617,505

[22] Filed: Sept. 29, 1975

[30] Foreign Application Priority Data

Sept. 28, 1974 United Kingdom .............. 42255/74

[51] Int. Cl.² .............................................. A01C 1/00
[52] U.S. Cl. .................................. 47/58; 47/DIG. 12
[58] Field of Search .................... 47/58, DIG. 12, 1.3, 47/14, 16; 179/110; 259/1 X; 195/71

[56] References Cited

U.S. PATENT DOCUMENTS

| | | | |
|---|---|---|---|
| 2,745,789 | 5/1956 | Specht | 195/71 |
| 3,499,436 | 3/1970 | Balamuth | 47/DIG. 12 |
| 3,703,051 | 11/1972 | Weinberger | 47/58 |
| 3,902,273 | 9/1975 | Friedman | 47/58 |
| 3,911,619 | 10/1975 | Dedolph | 47/14 |

OTHER PUBLICATIONS

Do you chat —, (Right Now), McCalls magazine, Feb. 1971.
Rock around the garden, Thomsen, Science News, vol. 102 July 15, 1972, pp. 44-45 cited.

*Primary Examiner*—Robert E. Bagwill

[57] ABSTRACT

A method of accelerating the metabolism of plant organisms using sound in which the plant organism is interrogated as to which frequency of sound it prefers (or abhors in a suitable case). Sound at the "favored frequency" indicated by the test is then applied to the plant organism. The method has application to germination of seeds and growth of plants. Apparatus for inducing germinating of seeds particularly barleycorns is described and provides means for applying sound to the seeds while they are soaked in water and then respirated.

13 Claims, 5 Drawing Figures

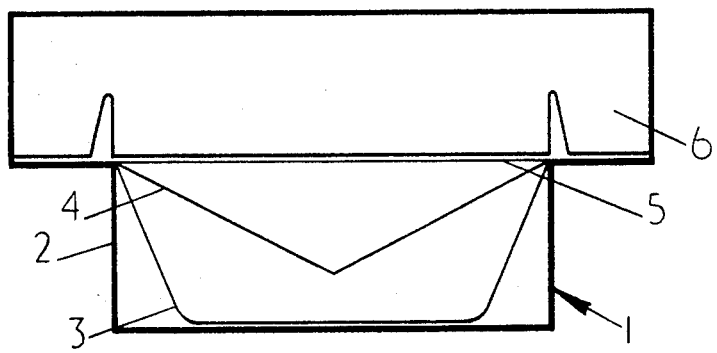
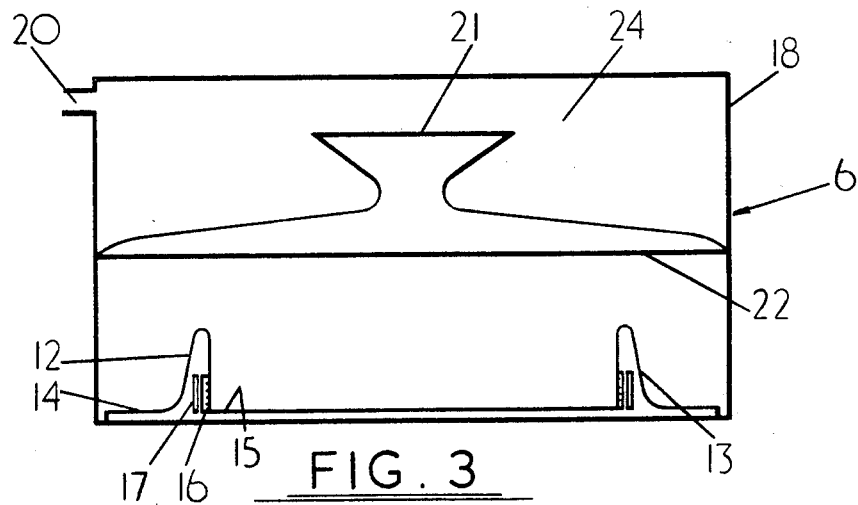

METHOD OF AND APPARATUS FOR TREATING PLANT ORGANISMS

The present invention relates to a method of and apparatus for treating plant organisms such as seeds and plants, and in particular it relates to the induced acceleration of seed and plant metabolism.

In the various branches of agriculture and horticulture much time, money and effort is expended in attempting to induce seeds to germinte faster and more uniformly and to induce plants to grow more quickly. The benefits of such acceleration in the metabolisms of plant organisms are self-evident and are becoming increasingly important in a world where there is an increasing demand for more food produced faster than is done conventionally.

According to a first aspect of this invention there is provided a method of inducing acceleration of the metabolisms of plant organisms such as seeds and plants and including the steps of testing the plant organism to determine a frequency favoured by the plant organism and applying sound at said "favored frequency" to the plant organism while the latter is subjected to the conditions of heat, light and moisture normally provided.

Preferably, if full advantage of the sound application process is to be obtained, the plant organism is tested regularly to determine its progress and where appropriate, the conditions of heat, light and moisture to which the plant organism is subjected are changed more rapidly than normal.

In a preferred embodiment for the enhancement of plant growth a small interrogating electrical current is applied across a portion of the plant, sound of different predetermined frequencies is applied to the plant and variations in the interrogating current are observed so as to determine optimum responses of the plant as the frequency of the sound is varied and subsequently applying to the plant sound of the "favored frequency" that has been observed to produce a predetermined optimum response.

In a preferred embodiment for the germination of seeds, the seeds are bombarded with sound whose frequency is varied over a range and the sound level transmitted and reflected by the seeds is detected to determine which frequencies are best absorbed by the seeds. The "favored frequency" is then selected from the best-absorbed frequencies by the application of an interrogating current passed through selected ones of the seeds while subjected to sound of respective ones of the best-absorbed frequencies, the resistance characteristics of the respective seeds indicating which frequency is the "favored frequency".

According to a second aspect of this invention there is provided apparatus for inducing a break in dormancy and/or inducing germination of a batch of seeds, said apparatus including a container for water, a perforated container for the seeds mounted within the water container and sound producing means mounted on the seed container.

Preferably the sound producing means is in the form of a rolling diaphragm speaker.

Figure 4:
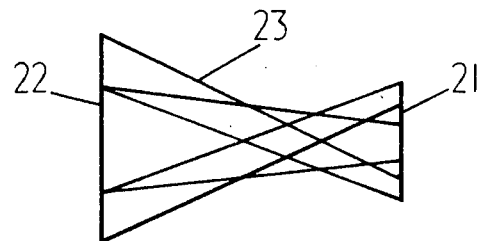
Figure 5:
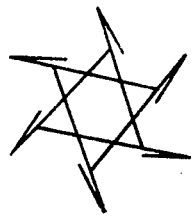

Embodiments of the present invention will now be described by way of examples only, with reference to the accompanying drawings in which:

FIG. 1 is a schematic diagram of a first form of apparatus for inducing a break in dormancy and/or promoting germination of a batch of seeds in accordance with the invention; and FIG. 2 is a schematic diagram of a modified form of the apparatus shown in FIG. 1; and FIGS. 3 to 5 are schematic diagrams of parts of the apparatus shown in FIG. 2.

Referring to FIG. 1 a water container 1 comprises an outer cage 2 having an inner flexible plastics lining 3 within which is mounted an inverted, perforated conical vessel 4 made of stainless steel and covered by a flexible plastics layer 5 secured to a rigid ring (not shown) round its periphery.

Mounted on the open top of the vessel 4 is a rolling diaphragm speaker 6. Referring to FIG. 2, a modified form of the apparatus shown in FIG. 1 has, instead of the cage 2 and lining 3, a concrete shell 7 whose periphery forms an exhaust manifold 8 opening into the space under the vessel 4. An inlet manifold 9 above the manifold 8 opens into the top of the vessel 4 and can be provided with an arrangement of ceramic wicks (not shown) which can serve to provide air drawn into the vessel 4 with a required degree of humidity. A seed inlet 10 is provided in the layer 5 and a seed outlet 11 extends downwardly from the centre of the vessel 4 which is rotatably mounted within the shell 7 so that seed entering through the inlet 10 can be evenly distributed in the vessel 4. Otherwise the apparatus is similar to that shown in FIG. 1.

Referring to FIG. 3, the speaker 6 which is believed to be of novel design, has a diaphragm 12 comprising a frusto-conical portion 13 having a flange 14 round its base and central sound-producing portion 15 integrally formed with the portion 13. An inner coil 16 is secured to the portion 15 and is arranged to provide a D.C. magnetic field when supplied with direct current. An outer field coil 17 is mounted closely around the coil 16 and when supplied with an alternating current, acts on the coil 16 and hence on the portion 15 to cause the latter to oscillate and so produce sound of a desired frequency.

The diaphragm 12 is mounted in an airtight cabinet 18 provided with a backhorn 19 and having a pressure control port 20 connected to a vacuum pump (not shown).

The diaphragm is made of room temperature vulcanized silicone rubber reinforced with dacron. The coil 16 is formed by etching the outer copper layer of a rolled-up printed circuit board. The etching is carried out using electrolysis in a bubble filled electrolytic medium, the sphericity of the bubbles serving to form a helical groove of part-circular cross-section through the copper layer and inhibiting any tendency for the occurrence of undercutting of the copper adjacent the groove.

The groove is then filled with thorium dioxide and the entire coil is coated with insulating silicone varnish.

The coil-carrying plastics tube so obtained is secured by adhesive to the silicone rubber portion of the diaphragm such that the coil 16 is contained within the space above the vessel 4 by the silicone rubber. The small spacing between the coil 16 and the coil 17 around it, is filled with molybdenum disulphide as spacing agent.

Referring also to FIGS. 4 and 5 the backhorn 19 is formed by means of two spaced parallel rings 21, 22 of different diameters interconnected by a plurality of wires 23 which form a neck of generally hyperbolic outline when the rings are rotated relative to each other. The wires 23 are interconnected by an elastic web (not shown) of plastics material so that the backhorn can define a space having an adjustable outlet via the neck to a chamber 24 which is connected to the vacuum pump. Use of the vacuum pump and adjustment of the neck provides variation in the acoustic loading on the diaghragm 12 and it has been found that high resolution sound can thus be obtained.

It has been found that, in using the application of sound to accelerate the metabolism of a plant organism, the intensity of the sound applied is not a critical factor but generally if the sound intensity is in the range 70 to 120 db it will provide an advantageous effect. However at the upper end of the range there may be a wastage of energy while at the lower end of the range the intensity may not provide the optimum effect. The optimum effect can be achieved by determining the minimum intensity which provides the best results and arranging the geometry of the apparatus and the batch of seeds so that all the seeds are subjected to as near (from above) the minimum intensity as possible. Clearly a cost-effectiveness factor will be involved where use of intensity levels above a certain level leads to diminishing returns. However, as stated above, the intensity is not a critical factor and an effective level can be readily determined.

In general, when germinating seeds, a batch of seeds is bombarded by sound whose frequency is varied while the sound transmitted and reflected by the batch of seeds is detected and measured using conventional equipment. The frequency or frequencies which give rise to the least detected transmission and reflection of the sound by the seeds is or are noted as being the "best-absorbed" frequencies.

When the best-absorbed frequencies have been established, randomly selected ones of the seeds are each connected to an associated pair of electrodes. One of the electrodes is connected to the embryo of the seed and the other electrode is connected to the endosperm. An interrogating current is then applied between the electrodes and this current is increased steadily from 0 to 40 mA DC while the seed being tested is subjected to sound at one of the "best absorbed" frequencies. By applying sound at each of the best-absorbed frequencies to several of such seeds and determining the resistance characteristics of the respective seeds as their interrogating currents are increased from 0 to 40 mA, the frequency or frequencies producing optimum response from the seeds can be determined and constitute the "favored frequency" which is usually a single frequency but may comprise a combination of frequencies each producing good responses.

It has been found that those resistance characteristic curves which are generally smooth indicate the best of the "best-absorbed" frequencies while with those frequencies which are undesirable the resistance characteristic curve exhibits an abrupt irregularity (indicating rupture of cell walls, for example).

Sound at the "favored frequency" is then applied to a batch of seeds so that as many as possible are subject to an intensity which is known to be effective. This can be done most simply and reliably by directing the sound transversely to a single layer (not necessarily flat) of the seeds.

When subjecting dormant seeds to conventional environmental conditions of heat, light, and moisture (including humidity) suitable for inducing germination, it has been found significantly advantageous to apply sound at the "favored frequency" of the seeds. It has been found that seeds reach equivalent growth stages earlier and more uniformly when sound at the "favored frequency" is supplied.

A particular area of interest in the field of seed germination is the malting of barley where there is an initial process of "steeping" involving a repetition of a cycle comprising first and second stages in which the seeds (corns) are respectively soaked and respirated (or subject to withdrawal of water vapour and carbon dioxide).

After the "steeping" the germination of the corns is continued as a third stage at 100% humidity and 15° C for a period of some days.

During such a typical cyclic germination process the conclusion of the initial stage of breaking dormancy is determined by the detection of a moisture content greater than 45% in the embyro of each of a sample of the seeds. The second stage is then initiated and its conclusion is determined by the detection of gibberellic acid from an intercellular wash of a seed sample. As soon as the second stage is concluded, the cycle of first and second stages is repeated until cytase appears in the endosperm. The conclusion of each of the first and second stages during the cycles following the first cycle is determined simply by using the same time duration of the stage as determined during the first cycle.

When cytase has appeared in the endosperm the third stage is carried out.

By determining such testing criteria for a representative sample of seeds of interest the improvement in speed of the germination process due to the application of sound can be determined and optimum cycle times can be determined for all subsequent germination processes involving seeds of the same type without the need for repeated testing to determine progress of the seeds during their germination. After the detection of cytase in the endosperm, it has been found advantageous to provide sound not only at the "favored frequency" for the seeds but also at a "favored frequency" for the resulting plant. This "plant favored frequency" is determined by supplying a small D.C. "interrogating" current, for example, about 40 mA DC across a portion of the plant, e.g., a leaf, and observing the variation of the current as sound of different frequencies is applied to the plant.

It has been found that if the interrogating current is displayed on an oscilloscope screen then, before the application of any sound, the resistance of the plant varies to produce a slight oscillation or ripple in the interrogating current. It has also been found that sound of one or more discrete frequencies can affect the amplitude of the ripple so that "smooth parts" and "flare-ups" appear in the trace of the interrogating current. In addition, it has been found that the frequencies which produce the "smooth parts " in the trace stimulate the plant's growth most.

The acceleration in seed germination and plant growth has been found for barley, wheat, tomato, beets, carrots, spinach, radishes, green onions, celery, lettuce and avocado and compared with control plants (no sound applied) substantial improvement in size of the eventual crop of the order of 2.4 to 3.1 times has been found for similar growth times.

It has also been found that a "favored frequency" of 330 Hz for seed germination and 4960 Hz for plant growth can be used with good effect for any of the plants listed above although other favoured frequencies have also proved beneficial, e.g., 230 Hz and 305 Hz for seed germination.

It is thought (although this is not to be regarded as essential to the invention nor as restricting the scope of the claims in any way) that the application of sound at the favored frequencies may facilitate fluid and/or molecular transport within and between cells and across cell walls. It has also been observed that plants subjected to sound remain unusually free of insect pests.

To accelerate growth of plants established conventionally or from sound-germinated seeds, it has been found effective to apply sound at the "plant favored frequency" alone (i.e., without the "seed favored frequency"). Again sound intensity in the range 70–120 db has been found effective although not critical compared with the effect of frequency. It is to be noted that references to sound intensities are to be taken as meaning intensities measured at the plant or seed, i.e., effective sound intensity.

To germinate barley using the apparatus described above, dormant barley corns are loaded into the vessel 4 and the container 1 is filled with water to soak the corns by infiltration through the perforations in the vessel 4. The speaker 6 is then driven to supply sound energy to the corns via the transmitting medium of the water which is closely contained by the container 1 and layer 5 to have minimal free surface. After a predetermined soaking period, for example 8 hours, the water is drained from the container 1 and a "withdrawal stage" of 14 hours duration is commenced during which time water vapour and carbon dioxide is drawn from the vessel 4 by means of a vacuum pump. The supply of sound from the speaker 6 is continued during this withdrawal stage which with the "soaking stage" forms one cycle of a multicycle operation known as "steeping" which induces a break in the dormancy of the corns and initiates germination. It has been found that the application of sound during the steeping operation has effected a 50% reduction in its duration to progress the corns to a similar stage in their germination. It has also been found that the stages of the steeping cycles can be shortened and it has been found possible to obtain adequate germination for malting purposes using two cycles each having a soaking stage of 6 hours and a withdrawal stage of 10½ hours.

When the steeping operation has been completed, germination is continued by maintaining the corns at 100% humidity and 15° C for a period during which sound (now including "plant favored frequency") is continuously applied until a desired state of germination is obtained. Again, it has been found that this latter period, which, using conventional procedures, is about 6 days, can be reduced by as much as 50% by the application of sound. An associated advantage of applying sound is that the breaks in dormancy of the corns are nearer to being simultaneous than with conventional procedures. Also the subsequent germination rates are more uniform.

It has been found that, in addition to stimulating germination, the sound has the effect of inhibiting the tangling of the growths from the germinating corns to the extent that there is little or no need to carry out the conventional step of stirring or disturbing the corns to prevent the tangling. It is thought that this latter conventional step may have the disadvantage of disturbing the geotropic mechanism of the corns, and may slow down the germination process.

It has been found that sound having the relatively low frequencies of 230 Hz, 305 Hz and 330 Hz and at levels of about 95 to 120 db provides good results in the barley germination process described above. It has also been observed that where the seeds are surrounded by water during the application of sound, it is beneficial as regards efficiency, to reduce the free water surfaces (which can break up and so dissipate the sound energy) to a minimum.

It is to be noted that to detect the resistance characteristics of the seeds it is only necessary to measure the applied voltage necessary to obtain a desired value of the interrogating current.

It is also to be noted that this invention not only has application to those plant organisms which provide positive beneficial results in response to the various tests described above but may also have application in retarding growth where desired if appropriate plant organisms such as weeds provide results indicating that there are frequencies which retard growth or germination.

In such a case the "acceleration" of the metabolism is negative and the term "favored" is to be considered as meaning "favorable for retardation".

What is claimed is:

1. A method of inducing acceleration of the metabolisms of plant organisms such as seeds and plants comprising the steps of testing a plant organism by subjecting it to sound at a plurality of frequencies in turn and, while each frequency is being applied, detecting at least one substantially immediate response characteristic of at least part of the plant organism to determine a frequency favored by the plant organism and thereafter applying sound at said favored frequency to the plant organism while the latter is subjected to the conditions of heat, light and moisture normally provided.

2. A method according to claim 1 and including the further steps of testing a representative sample of the plant organism to determine its progress and varying the conditions of heat, light and moisture to which the plant organism is subject to match the detected stages in the progress of the plant organism.

3. A method according to claim 1 wherein said step of testing the plant organism to determine the favored frequency includes the step of applying a small interrogating electrical current through electrodes connected to the plant organism and detecting the electrical characteristics of the plant organism while subjecting the latter to sound at a frequency which is varied in a predetermined manner, the favored frequency being a frequency at which said electrical characteristics take a predetermined optimum form.

4. A method according to claim 3 and including the step of increasing the interrogating electrical current from 0 to 40 mA and detecting the applied voltage so as to determine the resistance characteristic of the plant organism.

5. A method according to claim 3 and including the step of observing the interrogating electrical current on an oscilloscope to detect differences in response to sound at various frequencies.

6. A method according to claim 1 wherein the sound is applied at an intensity in the range 70 to 120 db.

7. A method of inducing acceleration in the germination of seeds comprising the steps of bombarding the seeds with sound, varying the frequency of the sound, detecting the levels of sound transmitted and reflected by the seeds to determine the best-absorbed by said seeds, applying an interrogating electrical current through each seed of a representative sample of the seeds, bombarding the seeds of the sample with sound at respective different ones of the best-absorbed frequencies, increasing the interrogating electrical current over a predetermined range and detecting the seed providing a predetermined optimum resistance characteristic.

8. A method according to claim 7 wherein one electrode is connected to the embyro of, and another electrode is connected to the endosperm of, each seed in said representative sample.

9. A method according to claim 8 wherein for each seed of said representative sample, said interrogating electrical current is increased from 0 to 40 mA and the applied voltage is detected to determine the resistance characteristic of the seed.

10. A method according to claim 7 wherein the applied sound has a frequency which is any one of 230 Hz, 305 Hz and 330 Hz.

11. A method of inducing acceleration in the growth of plants and including the steps of applying a small interrogating current through a portion of the growing plant, subjecting the plant to sound, varying the frequency of the sound, observing the waveform of the interrogating current and applying sound to the plant at a favored frequency as determined by observation in the waveform of the interrogating current of a predetermined optimum response.

12. A method according to claim 11 wherein the sound applied to the plant is at a frequency of 4960 Hz.

13. A method of accelerating the germination of barleycorns comprising the steps of testing the corns to determine their favored frequency carrying out a first stage of soaking the corns in water and simultaneously applying sound to them at said favored frequency, carrying out a second stage of withdrawing water vapor and carbon dioxide from the corns while simultaneously applying sound at said favored frequency, repeating a cycle comprising said first and second stages and then carrying out a third stage in which the corns are subjected to 100% humidity at 15° C and to sound at said favored frequency in combination with sound at 4960 Hz.

* * * * *